United States Patent [19]
Narendra et al.

[11] Patent Number: 5,339,281
[45] Date of Patent: Aug. 16, 1994

[54] COMPACT DEPLOYABLE ACOUSTIC SENSOR

[75] Inventors: Patrenahalli M. Narendra, Edina; Russell D. Braunling; William J. Wegerer, II, both of Eden Prairie; Jonathan C. Werder, Maple Grove, all of Minn.

[73] Assignee: Alliant Techsystems Inc., Hopkins, Minn.

[21] Appl. No.: 102,466

[22] Filed: Aug. 5, 1993

[51] Int. Cl.$^5$ .......................... H04B 1/59; G01S 3/80
[52] U.S. Cl. ............................ 367/5; 367/99; 367/118; 367/119; 367/136; 367/178; 340/566
[58] Field of Search ...................... 367/3, 4, 5, 99, 153, 367/155, 165, 118, 119, 136, 178; 441/33; 340/566

[56] References Cited

U.S. PATENT DOCUMENTS

| | | | |
|---|---|---|---|
| 3,389,373 | 6/1968 | Angeloff et al. | 367/129 |
| 3,736,557 | 5/1973 | Brynk | 340/16 R |
| 3,979,712 | 9/1976 | Ettenhofer et al. | 340/6 R |
| 4,193,057 | 3/1980 | Bennett et al. | 367/153 |
| 4,208,738 | 6/1980 | Lamborn | 367/173 |
| 4,212,085 | 7/1980 | Vaillancour et al. | 367/124 |
| 4,281,551 | 8/1981 | Gaudriot et al. | 73/647 |
| 4,301,523 | 11/1981 | Meland et al. | 367/123 |
| 4,559,605 | 12/1985 | Norsworthy | 364/726 |
| 4,592,034 | 5/1986 | Sachse et al. | 367/127 |
| 4,649,524 | 3/1987 | Vance | 367/13 |
| 4,725,988 | 2/1988 | Secretan | 367/4 |
| 4,910,718 | 3/1990 | Horn | 367/124 |
| 4,999,816 | 3/1991 | Dale et al. | 367/4 |
| 5,007,032 | 4/1991 | Jensen | 367/136 |
| 5,027,333 | 6/1991 | Halling | 367/131 |
| 5,091,892 | 2/1992 | Secretan | 367/153 |
| 5,095,467 | 3/1992 | Olson | 367/125 |
| 5,117,396 | 5/1992 | Castile et al. | 367/3 |
| 5,195,060 | 3/1993 | Roll | 367/118 |
| 5,197,036 | 3/1993 | Buckingham | 367/4 |

*Primary Examiner*—J. Woodrow Eldred
*Attorney, Agent, or Firm*—Vidas, Arrett & Steinkraus

[57] ABSTRACT

A sensor for detecting acoustic energy emitted by a target is disclosed. The sensor comprises a housing including a plurality of transducers for receiving acoustic energy. The transducers are randomly deployed within a predetermined area around the housing, forming an array and a self-survey technique is utilized to determine the positions of the sensors. Beamforming techniques are utilized to analyze the acoustic energy detected by the transducers to provide the azimuth of a target and a class estimate of the target. A plurality of sensors may be utilized to provide target location, course and velocity.

20 Claims, 6 Drawing Sheets

COMPACT DEPLOYABLE ACOUSTIC SENSOR

FIELD OF THE INVENTION

This invention relates to the field of target detection and classification and more particularly, to an apparatus and method for detecting and classifying objects emitting acoustic energy.

BACKGROUND OF THE INVENTION

Previously, air acoustic sensors have been utilized to form arrays and provide azimuth estimates of sound sources. However, these systems require either large mechanical devices for fixed arrays or do not provide a compact deployable unit which produces accurate results.

For example, U.S. Pat. No. 4,208,738 by Lamborn relates to a deployable sonar array with interconnected transducers including a housing with electronics where the transducers are released when the housing is launched.

U.S. Pat. No. 5,027,333 to Hailing is directed to an acoustic array including a plurality of the transducing elements which are free floating.

U.S. Pat. No. 4,559,605 to Norsworthy relates to beamforming method utilizing a number of sensing elements which take up random positions where the relative positions of the elements are determined using triangulation.

Also, a device known as Smart Standoff Mine Active Countermeasures (SSMAC) beamformer utilizes mechanical deployment of a complex shaped predetermined array to employ beamforming techniques.

Consequently, a need remains for a compact, easily deployable system where transducers are randomly dispersed and a coordinate system may be formed so that accurate azimuth outputs and target class estimates are obtained from advanced beamforming techniques. The present invention eliminates physical constraints in transducer locations allowing use of larger arrays with a greater number of transducers which results in significant performance improvement.

SUMMARY OF THE INVENTION

The compact deployable sensor comprises a housing, a plurality of transducers carried inside the housing, means for randomly distributing the transducers within a predefined area surrounding the housing, the transducers being conductively connected to the housing and each generating an analog output signal indicative of the acoustic energy received from a target, self-survey means electrically connected to the plurality of transducers for determining the position of the transducers relative to the housing, computing means electrically connected to the plurality of transducers for analyzing acoustic energy received by the plurality of transducers.

The compact deployable sensor has computing means for analyzing acoustic energy comprising means for convening the analog output signals of each transducer at a predetermined sampling rate into digital signals, means for adaptive beamforming connected to the digital signals of the transducers wherein a predetermined number of beams are generated and the acoustic energy received in each beam is determined, and target detection means connected to the adaptive beamforming means for determining the median acoustic energy of the beams and locating beams with an acoustic energy a predetermined amount above the median acoustic energy whereby a signal constituting the azimuth angle to the target emitting the received acoustic energy is produced.

The inventive sensor may be utilized to determine not only target azimuth, but target classification as well. A plurality of sensors may be utilized to determined target location, course and velocity.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated.

Figure 1:
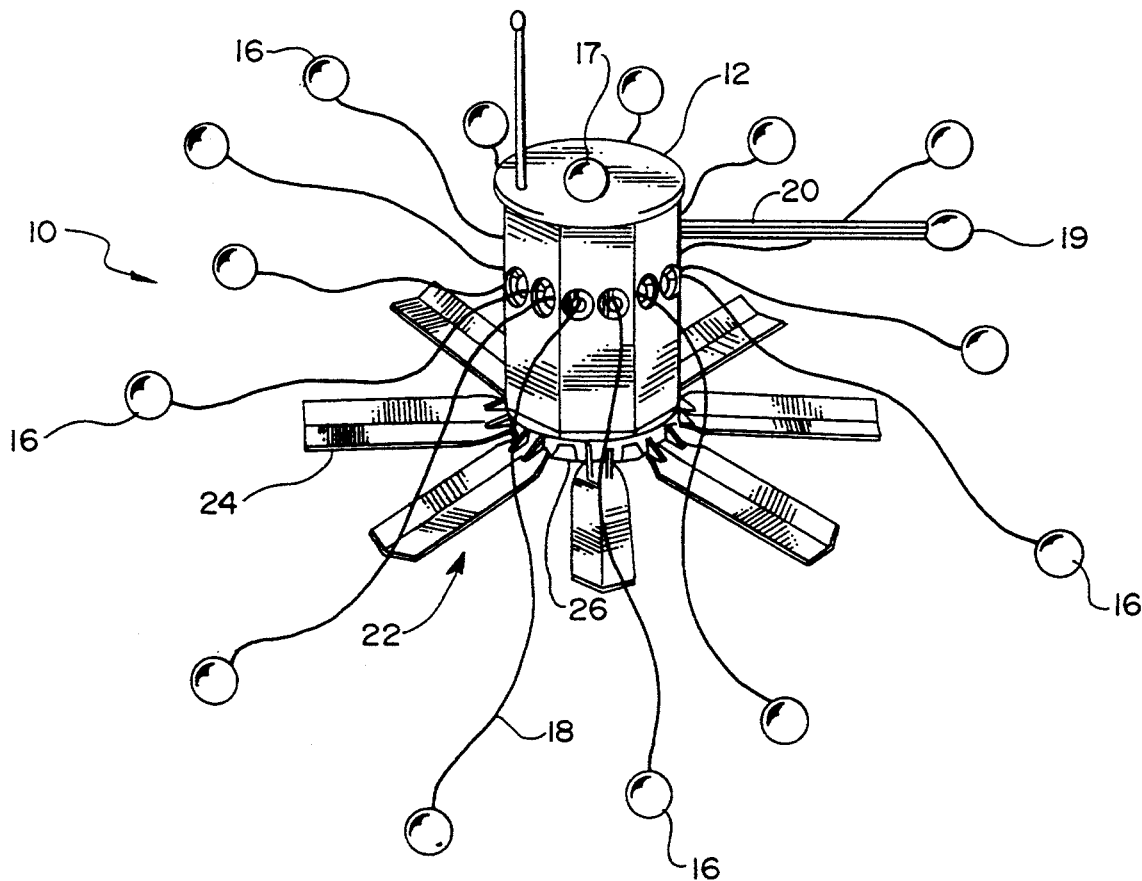
FIG. 1 is a perspective view of an embodiment of the invention.
Figure 5:
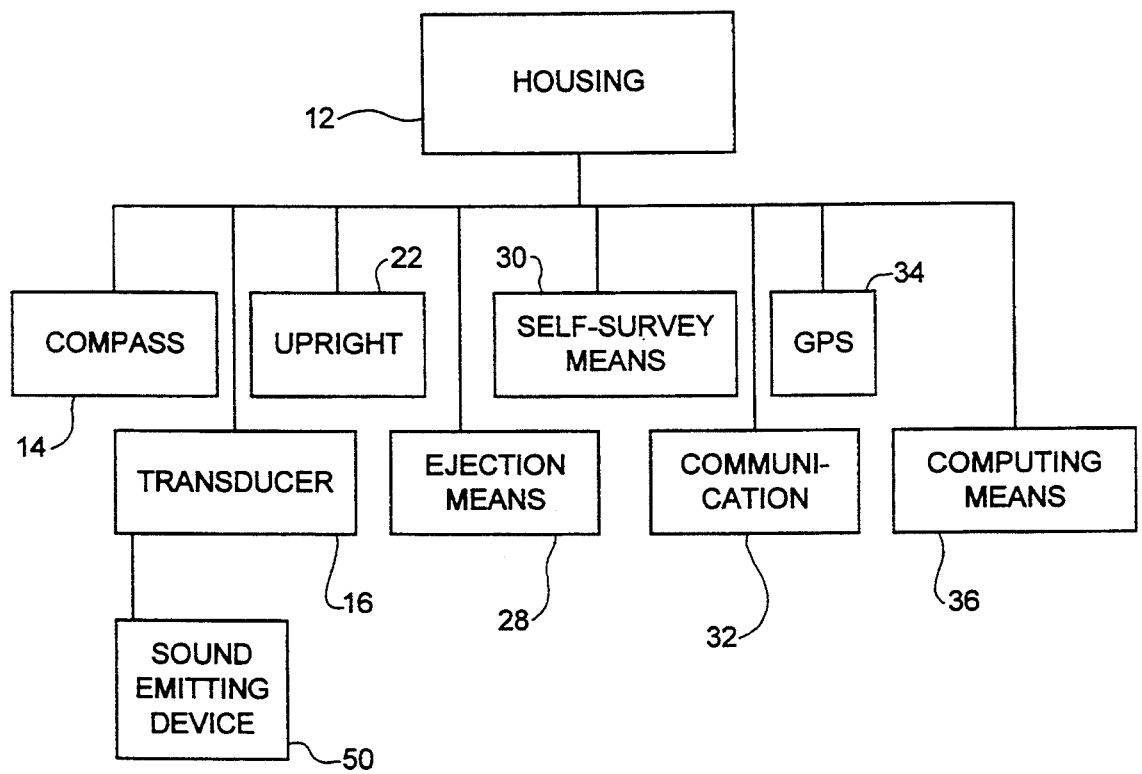
FIG. 5 is a general block diagram of the contents of the housing of the invention.

Referring now to FIG. 1, there is shown a compact deployable acoustic sensor 10 in a ready to operate state. The sensor 10 includes a housing 12. The housing 12 may be constructed of steel although any suitable material may be utilized. The sensor 10 may be positioned for use by hand placement, air dropped or may be artillery launched. At the time of launch, the housing 12 contains and protects all other features of the invention. FIG. 5 is a schematic block diagram of the housing 12 and its various electronic, software, and mechanical subelements.

While not specifically detailed in FIGS. 1 and 5, it will be understood that the various electronic and software functional blocks are properly connected to appropriate bias and reference supplies so as to operate in their intended manner. It should also be understood that the processing described herein utilizes well known microprocessor technology which is connected to appropriate memory, buffer and other peripheral devices so as to operate in their intended manner.

Referring now to FIGS. 1 and 5, the housing 12 includes a power source (not shown) to operate the system which is well known in the art. The housing 12 also includes a compass or azimuth orientation device 14. The compass 14 is an electronic compass and is utilized to orient the sensor 10 to magnetic north. The sensor 10 also includes a plurality of microphones or transducers 16, 17 and 19. The transducers 16, 17 and 19 are acoustic, omni-directional, amplitude and phase matched and responsive from 5 Hz–300 Hz, and are readily available commercially from Bruel & Kjuer or other manufacturers. A number of transducers 16 are connected to the housing 12 by means of connecting wires or trailing wires 18. In this manner, the transducers are conductively coupled to the housing 12. The housing also includes two transducers 17 and 19 which are fixedly attached to the housing 12 using stacers 20, as seen in FIG. 1. Any suitable means or combination of means for connecting the transducers 16, 17 and 19 to the housing 12 may be used.

As mentioned above, the housing 12 contains and protects all the elements of the invention at the time of deployment. When the sensor 10 has been placed or launched into position the housing 12 must erect itself to an upright position so that the transducers 16, 17 and 19 may be properly deployed. Therefore, the housing 12 includes an erecting mechanism 22. This mechanism 22 is shown in FIG. 1. In a preferred embodiment, the mechanism 22 includes paddles 24 and a spring system 26 for moving the paddles 24. Before the spring system 26 is actuated the paddles 24 are held to the housing 12. After the spring system 26 is actuated the paddles 24 are forced out from the housing 12 and the housing 12 erects itself. In this manner, the sensor 10 will upright itself without regard to its landing position. Other embodiments of the invention may include the use of spring fingers, not shown, constructed of spring steel.

Now that the housing 12 is in an upright position the sensor 10 may ready itself to operate or power up. It is well known in the art to include sensor means to detect noise, vibration, seismic energy or the like and initiate a power up of the sensor. This allows the sensor to operate longer on its stored energy. Ejection means 28 are utilized to eject the transducers 16 within a predetermined area surrounding the housing 12. Ejection means 28 are known to those skilled in the art and may include spring loaded, compressed gas, chemical propellant, or hot gas ejection means. In the preferred embodiment, fourteen transducers 16 are ejected from the housing 12 and connected by trailing wires 18 and two transducers 17 and 19 are released by a stacer or spring loaded extendable member 20.

The transducers 16 which are ejected from the housing 12 are randomly arranged and a self-survey technique 30 is implemented to define the position or coordinate system of the transducers 16, 17 and 19. The self-survey technique is shown as block 30 in FIG. 5. The means for self-surveying 30 is electrically connected to the plurality of transducers 16 and is contained in the housing 12. The self-survey technique 30 will be explained in more detail below.

The housing 12 also contains a communications device 32 which can be utilized to transmit data to a receiver attached to a computer or satellite or other receiving means. The communication device 32 is well known to persons of ordinary skill in the art and thus need only be shown in block form.

The housing 12 further includes a differential global positioning system or GPS 34. The GPS 34 provides the latitude and longitude of the sensor 10. This information may be transmitted to a receiver so that a user may know the absolute position of the sensor 10 on the earth. The GPS 34 is well known to those skilled in the art and will only be shown in block form.

The housing 12 further includes computing means or integral signal processing means 36. The signal processing means 36 analyzes the outputs of the transducers 16, 17 and 19 to provide target azimuths and target classifications. The integral processing means 36 will be described in detail below.

Figure 2:
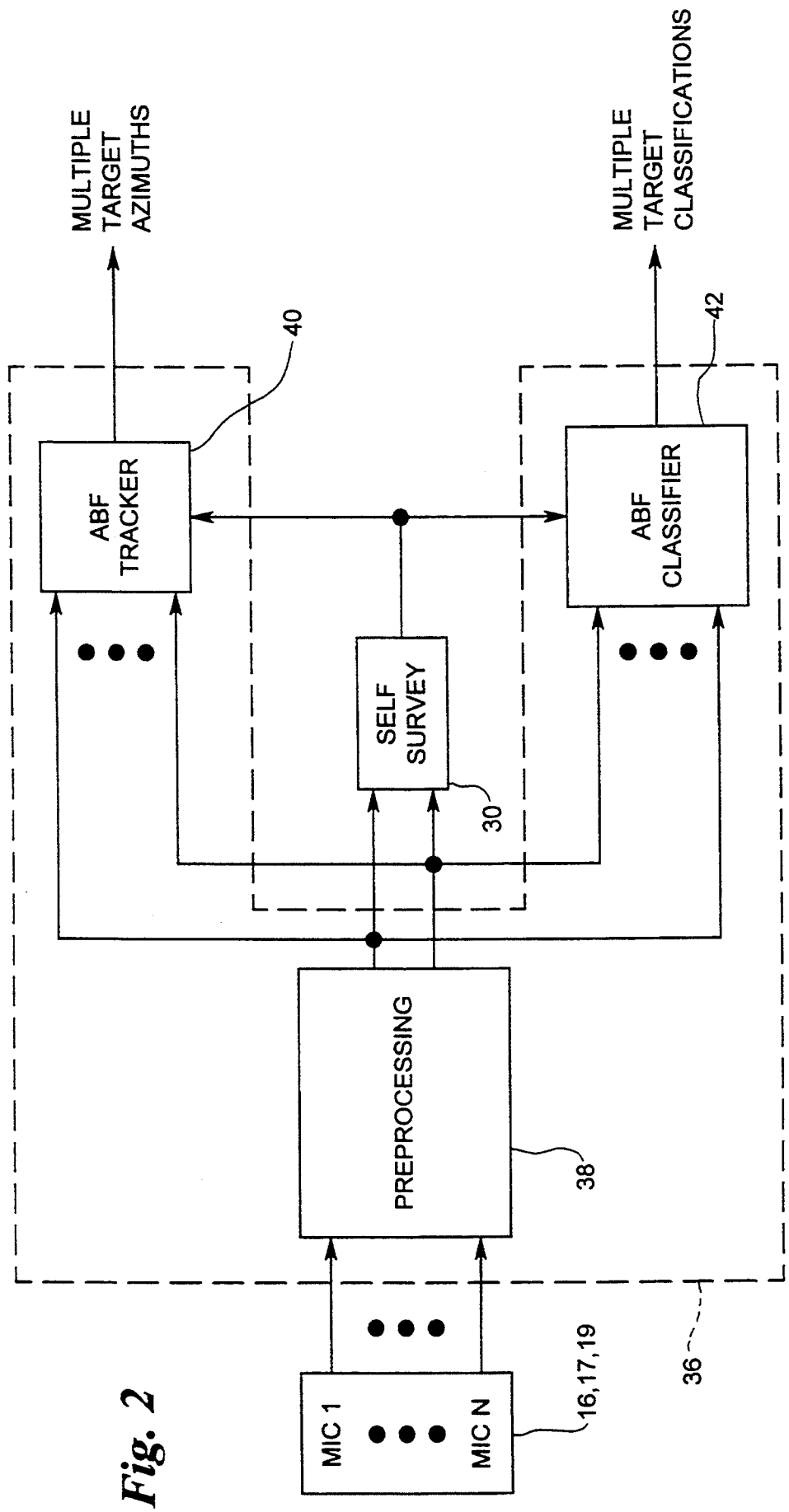
FIG. 2 is a general block diagram of the invention.

Referring now to FIG. 2, the self-survey means 30 and the computing means 36 is shown in more detail. Transducers 1 through N, referred to as reference numerals 16, 17 and 19, output signals to preprocessing block 38, which as will be discussed in more detail below, both samples the output of transducers 16, 17 and 19 and converts their output from analog to digital. In the preferred embodiment sixteen transducers are utilized. Block 38 in turn passes the digital signals to the transducer survey or self-survey block 30, the tracker block 40 and the classifier block 42, which will be discussed in more detail below.

The self-survey block 30 is used to determine the position of all transducers 16 relative to a predetermined origin of a coordinate system. In the preferred embodiment the predetermined origin is defined by a first transducer 17 which is attached to a stacer (not shown) such that the transducer 17 is positioned just above the top of the housing 12 on the longitudinal axis of the housing 12. A second transducer 19 is located on a stacer 20 which positioned the transducer 19 a known distance, 2 feet in the preferred embodiment, from transducer 17. Stacer 20 extends from the side of housing 12 such that stacer 20 is horizontal to ground and perpendicular to the longitudinal axis of housing 12. Transducers 17 and 19 form the X-axis of the coordinate system with transducer 17 defining the origin of that coordinate system.

In the preferred embodiment the self-survey technique 30 determines the coordinate system for an N-element array using only element-to-element spacing information. This information can be derived in a number of ways well known in the an such as speaker-microphone pairs, ultrasonics and active MMW systems. In the preferred embodiment speaker-microphone pairs are used to derive the element-to-element spacing information. Each transducer 16 includes a sound emitting device 50. Each transducer 16, in turn, is sounded and the time of sound travel to each of the other transducers is measured. In the preferred embodiment all pairwise distances are measured although it is only necessary to determine the distances for the equations outlined below. Although speaker-microphone pairs are used to determine the pair-wise distances in the preferred embodiment, regardless of the technique used to determine the pair-wise distances, the following algorithm can be used to locate each of the randomly distributed transducers 16 in the coordinate system.

The X coordinate of element i is defined by $$X_i = \frac{(X_2^2 + d_{1i}^2 - d_{2i}^2)}{2X_2}$$

Y coordinate by $$Y_i = \frac{(X_3^2 - 2X_3X_i + Y_3^2 + d_{1i}^2 - d_{3i}^2)}{2Y_3}$$

and the Z coordinate by $$Z_i = \frac{(X_4^2 - 2X_4X_i + Y_4^2 - 2Y_4Y_i + Z_4^2 + d_{1i}^2 - d_{4i}^2)}{2Z_4}$$

where, $d_{mn}$ is the measured distance between elements m and n $$X_2 = d_{12}$$

$$Y_3 = |(d_{13}^2 - X_3^2)^{\frac{1}{2}}|$$

$$Z_4 = |(d_{14}^2 - X_4^2 - Y_4^2)^{\frac{1}{2}}|$$

Figure 7:
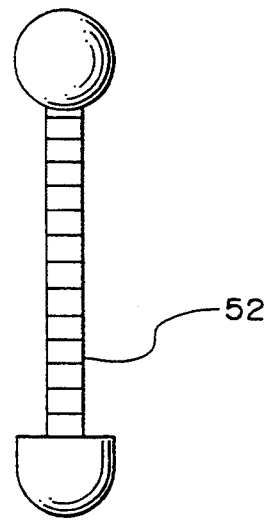
FIG. 7 is an elevational view of a transducer of the invention mounted on a member or stacer.

These coordinates are calculated by defining the origin to be element 1 (reference 17), the X-axis to be the line containing both elements 1 and 2 (references 17 and 19 respectively), and the plane Z=0 to contain elements 1, 2, and 3 (where reference 16 refers to elements 3 through N). In the preferred embodiment, each transducer 16 is mounted on a weighted stacer 52 which raises the transducer 12 to 16 inches above the ground (shown in FIG. 7). In this way, on level ground, all transducers 16 will lie in approximately the same plane Z=0. Therefore, the necessary and sufficient conditions for the algorithm to function are that elements 1 and 2 cannot occupy the same space, element 3 cannot be colinear with elements 1 and 2, and element 4 cannot be coplanar with elements 1, 2, and 3. If either of the final two conditions are not met, then selecting one or more of the remaining transducers, numbers 4 through N, to replace the elements that do not define a unique coordinate system will rectify the problem. In all instances one or more of the elements 3 through N will not be colinear with elements 1 and 2. In most instances, one or more of the elements 4 through N will not be coplanar with elements 1, 2 and 3 because of uneven ground. An alternative approach is to add additional transducers on stacers to provide unique dimensionality to the coordinate system.

The X-axis defined will be directly linked to a known position on the housing 12 so that a common coordinate frame is defined. Using the north finding device, or compass 14, to link the frame of reference to an earth reference, allows multiple arrays to have a common reference without the necessity of defining that reference using information coordinated from the multiple arrays, including developing a method to determine another arrays azimuth within one systems reference frame. This approach is an improvement over existing methods in that by fixing 2 of the N elements or transducers, absolute azimuth measurements in the ground plane rather than just relative measurements are provided. It should also be understood that the azimuth in the local coordinate system may also be referenced to the latitude and longitude provided by the global positioning system 34.

In the preferred embodiment the self-survey 30 to locate the transducers is done on power up of the sensor 10. However, it is considered routine engineering to conduct periodic self-surveys if desired.

Figure 3:
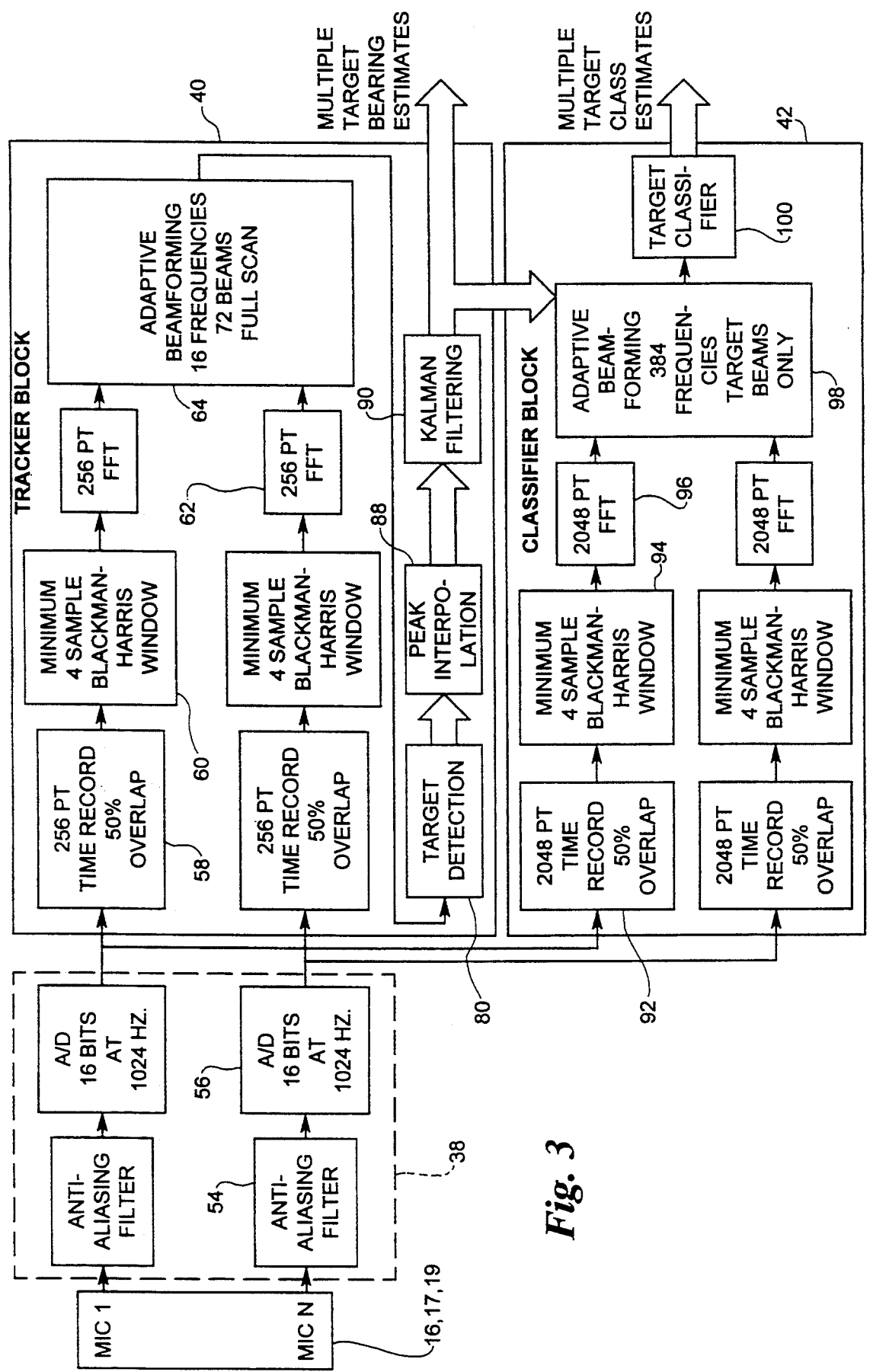
FIG. 3 is a detailed block diagram of the tracker and classifier portions of the invention.

Referring now to FIG. 3, blocks 38, 40 and 42 of FIG. 2 are shown in more detail. Block 38 consists of a plurality of anti-aliasing filters 54, each of which receives the analog signal from a corresponding transducer 1 through N. Anti-aliasing filters are well known in the art. In the preferred embodiment, anti-aliasing filter 54 is a low pass filter which filters out frequencies greater than 300 Hz. The output of anti-aliasing filter 54 is input to 16 bit A/D converter 56, which simultaneously samples the analog signal at 1024 Hz in the preferred embodiment. The 300 Hz limit of filter 54 is chosen to ensure that there are no frequency components above 512 Hz, which is $\frac{1}{2}$ the sampling frequency of 1024 Hz which satisfies the Nyquist criteria.

Referring now to tracker block 40 of FIG. 3, the output of each A/D converter 56 is input to a 256 point time record block 58. The 256 data points or samples in block 58 form 1 frame of data or a time record. A 50% overlap of each frame of data is provided such that frame 2 is comprised of 128 points of new data or samples and 128 points or samples from frame 1, which together comprise the 256 points of frame 2. Processing of the output of time record 58 occurs one frame at a time, or every $\frac{1}{8}$ second. The 256 point time record from block 58 is input to block 60 which is a Minimum 4-Sample Blackman-Harris (M4SBH) window, used to shape the FFT window, which is well known in the art. One skilled in the art recognizes that there are many data shaping methods available which could readily be adapted for use with this invention.

The output of the M4SBH window block 60 is input to a 256-point real FFT block 62 which converts the 256 data points from the sampled time domain to the frequency domain, as is well known in the art. The 256-point FFT block 62 defines 128 contiguous frequency bins, where each bin represents 4 Hz bandwidth. The 512 Hz range divided by 128 data points means that each bin represents 4 Hz. So for example, bin 1 has a center frequency at 0 Hz, bin 2 has a center frequency at 4 Hz, etc. to bin 128 which has a center frequency at 508 Hz. The 256 time domain data points are converted into the 128 frequency bins by block 62. Each block 62 inputs its 128 frequency bins to the adaptive beamforming block 64. In order to keep the amount of processing to an acceptable level, in the preferred embodiment 16 bins are chosen from the 128 bins input from each block 62. In the preferred embodiment, applicants' have empirically determined that most ground vehicles will output acoustic energy between 80-200 Hz. Therefore, since each bin represents 4 Hz, every other bin between 80 and 200 Hz provides the desired 16 chosen frequency bins. It should be understood that any desired number of bins could be processed as well as any desired number of transducers, depending on the application.

Figure 4:
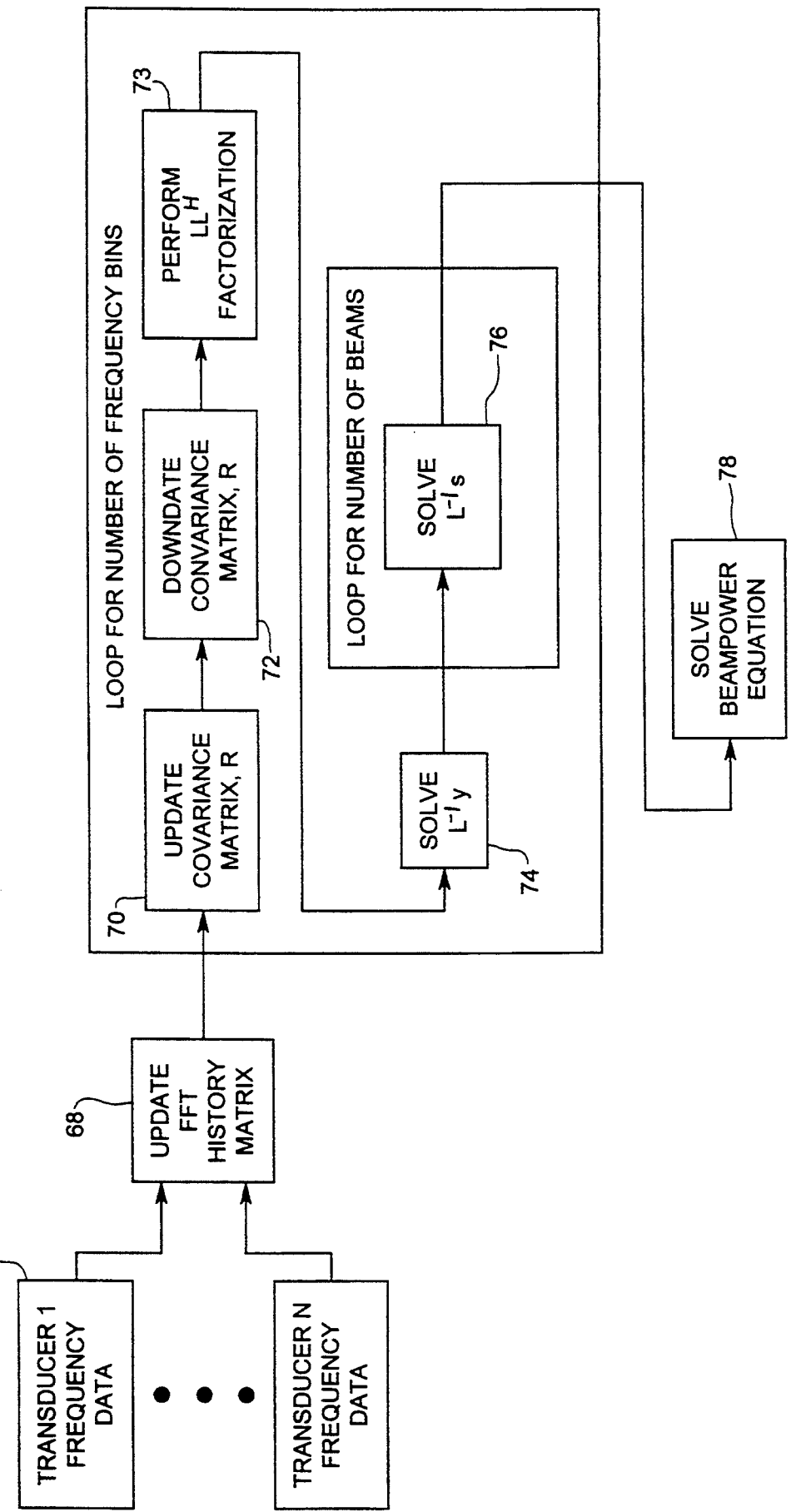
FIG. 4 is a general block diagram of the adaptive beam forming portion of the invention.

Referring now to FIG. 4, the details of the adaptive beamforming of block 64 is shown and the following variables support the derivations:

NA is the number of averages in the covariance matrix and the number of updates in the FFT history matrix.

$y_f$ is the FFT history matrix for frequency f for the most recent (NA+1) outputs where f denotes frequency bin.

$y_{ij}$ is an element of the FFT history matrix where i denotes row number, one for each transducer, and j denotes column number, one for each time sample.

$R_f$ is the averaged covariance matrix where f denotes frequency bin. There is one matrix for each frequency bin selected. $R_f$ is found by averaging the FFT outputs for each transducer as stored in the FFT history matrix for the most recent NA frames.

$R_{ij}$ is an element of the averaged covariance matrix where i denotes row number and j denotes column number.

$L_f$ is the lower triangular matrix of the factorization $L_f L_f^H$ of $R_f$ for frequency f.

$s_{f,b}$ is the steering vector for frequency f and beam b.

$z_{f,b}$ is the MVDR beampower output for frequency f and beam b.

Block 66 represents the frequency data for each transducer 1 through N. As is well known in the art, the output of the FFT of each of the 16 selected bins is comprised of a complex number which represents the amplitude or power of the frequency bin, as well as its phase. The 1 through N complex numbers associated with each transducer for one frame worth of data are input to block 68, which defines 16 FFT history matrices. Each FFT history matrix corresponds to one frequency bin of the 16 selected bins.

$$\text{Transducer \#1} \rightarrow \begin{bmatrix} y_{11} & y_{12} & \cdots & y_{1(NA+1)} \\ y_{21} & y_{22} & \cdots & y_{2(NA+1)} \\ \vdots & \vdots & & \vdots \\ y_{N1} & y_{N2} & \cdots & y_{N(NA+1)} \end{bmatrix}$$

↑ Most Recent FFT Data ↑ FFT data NA frames in the past

As can be seen from the history matrix above, $y_{11}$ through $y_{1(NA+1)}$ provide 17 frames worth of data, with the newest data represented on the left side of the matrix and the oldest data represented on the right side of the matrix. In other words, $y_{11}$ is the most recent FFT output for transducer #1, and $y_{1(NA+1)}$ is the FFT output from 16 frames in the past, in the preferred embodiment.

The FFT history matrix 68 is processed for each of the 16 frequency bins, which is shown in blocks 70–76. In block 70 the averaged covariance matrix, R, is initially defined $R_{ii}$=Robustness Constraint and $R_{ij}$=0, where i≠j. The Robustness Constraint provides stability and assures the covariance matrix to be full rank. The Robustness Constraint is described in detail in N. A. Lehtomaki, "Implementation Of A Robustness Constraint In Adaptive Beamforming", Proceedings Of IEEE ICASSP, Toronto, Ontario, May 14–17 (1991). Then in block 70, the covariance matrix is updated as follows:

$$R_{ij} = R_{ij} + y_{i1}y_{j1}^*$$

where * denotes complex conjugate.

After the NA+1 update, the oldest data needs to be removed from the covariance matrix, which is shown in block 72. The downdating in block 72 is done as follows:

$$R_{ij} = R_{ij} - y_{i(NA+1)}y_{j(NA+1)}^*$$

There will be one covariance matrix for each frequency to be beamformed. Following the example for one of the 16 frequencies, the $LL^H$ factorization 73 of the covariance matrix, R, must be performed. Matrix L can then be back substituted into both $y_f$ and $s_{f,b}$ to form $L^{-1}y$ and $L^{-1}s$, which will be discussed below. In block 74 the $L^{-1}y$ is solved for the particular frequency, whereas in block 76 the $L^{-1}s$ is then solved for each of the 72 beams. Then in block 78 the beampower equation is solved for each beam at the particular frequency. Blocks 70–76 are then repeated for each of the other 16 frequency bins.

The adaptive beamforming algorithm utilized is known in the art as Minimum Variance Distortionless Response (MVDR) and is defined as follows.

$$z_{f,b} = (\vec{z}_{f,b}\vec{z}_{f,b}^H)/NA$$

$$\vec{z}_{f,b} = \frac{(s_{f,b}^H R_f^{-1} y_f)}{(s_{f,b}^H R_f^{-1} s_{f,b})} = \frac{[(L_f^{-1} s_{f,b})^H (L_f^{-1} y_f)]}{[(L_f^{-1} s_{f,b})^H (L_f^{-1} s_{f,b})]}$$

The steering vector is used to phase each of the N transducers such that they coherently combine to sense acoustic energy in only one direction. NB directions (NB = number of beams), have been defined such that $\theta_b$ is given by:

$$\theta_b = 2\pi(b-1)/NB, b=1,NB$$

With 72 beams in the preferred embodiment, the steering directions are defined every 5°. Equivalently, $\theta_e$ is defined for each of the N elements based on the coordinate system developed in the self-survey technique. $\theta_e$ is the angle in the Z=0 plane such that the X-axis is colinear with $\theta_e$=0.

$$\theta_e = \tan^{-1}(Y_e/X_e), \quad e = 1,N$$

$$D_e = \sqrt{(X_e^2 + Y_e^2)} \cos(\theta_e - \theta_b)$$

and $$s_{f,b} = e^{j2\pi f \frac{D_e}{c}}$$

where c = the speed of sound.

It should be noted that this implementation forms beams in only the z=0 plane, but this can easily be extended to the more general 3 dimensional case. In the preferred embodiment the 2 dimensional implementation is utilized. At the output of the adaptive beamforming block 64 we have 72 beams and power numbers related to each beam for each of the 16 frequencies. Each of the sixteen power numbers for each of the 72 beams is averaged to provide 72 values of power.

Figure 6:
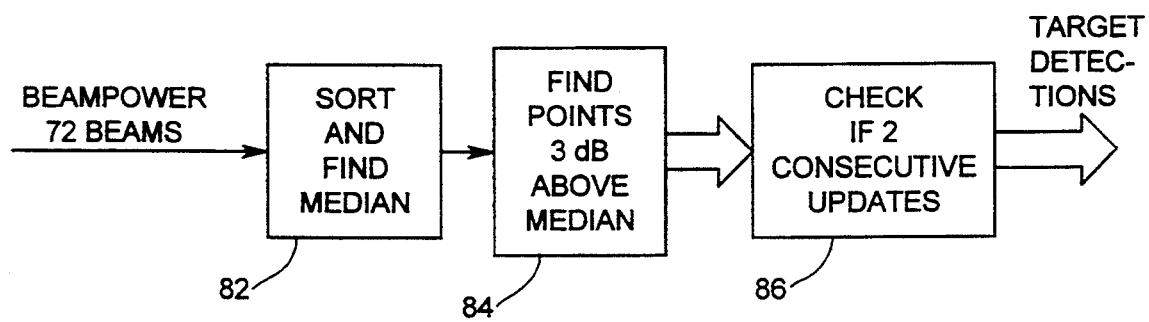
FIG. 6 is a general block diagram of the target detection system of FIG. 3.

The 72 values of power generated by block 64 for the 72 beams are input to target detection block 80, which is shown in FIG. 6. The 72 beams are sorted and the median value is calculated at block 82. In block 84, beams are identified which have power a predetermined value above the median. In the preferred embodiment this level is 3 dB above median. This level is chosen to reduce false target detection due to ambient noise. The beams which have power above the 3 dB threshold are input to block 86 which requires that each beam be 3 dB above the median for two consecutive updates. If block 86 determined that one or more beams are 3 dB above the median value for two consecutive updates, a target detection is indicated.

As shown in FIG. 3, the output of target detection block 80 is input to peak interpolation block 88. The purpose of block 88 is to estimate the location of the target peak in the beampower output. Given the detection information as input, the local maximum is located which corresponds to a target. An interpolated azimuth estimate is then calculated by fitting a second order polynomial to the local maximum and the two adjacent beampower values. The equations are described below:

Given the following data points:
P1=$(x_1,y_1)$ Adjacent Data Point
P2=$(x_2,y_2)$ Local Maximum
P3=$(x_3,y_3)$ Adjacent Data Point
where $x_i$ = beam number, and
$y_i$ = power.
General equation for a parabola:

$$y = ax^2 + bx + c$$

Maximum occurs at:

$$x_{max} = \frac{-b}{2a}$$

Second order curve-fining equations (fit P1,P2 and P3):

$$y_1 = ax_1^2 + bx_1 + c$$

$$y_2 = ax_2^2 + bx_2 + c$$

$$y_3 = ax_3^2 + bx_3 + c$$

Using Cramers' rule to solve for a and b; $x_{max}$ is determined by:

$$x_{max} = \frac{[x_1^2(y_2 - y_3) - x_2^2(y_1 - y_3) + x_3^2(y_1 - y_2)]}{-2[y_1(x_2 - x_3) - y_2(x_1 - x_3) + y_3(x_1 - x_2)]}$$

This is the interpolated azimuth estimate.

The output of peak interpolation block 88 of FIG. 3 is input to Kalman filtering block 90. Kalman filtering is well known in the art and is discussed at length in U.S. Pat. No. 5,095,467 which is commonly owned by the assignee, Alliant Techsystems Inc, which is hereby incorporated by reference.

The output of the Kalman filtering block 90 is the multiple target azimuth estimates which can be either stored for later transmission or transmitted to a receiver, such as a terminal or satellite.

Referring now to the classifier block 42 of FIG. 3, the digital signal output of the processor block 38 is input to the 2048 time record blocks 92 of classifier block 42. The 2048 point time record block 92 works similarly to the 256 point block 58, but gathers eight times as much data. In order to determine the class of target from its acoustic energy, much more data is required. The output of the 2048 time record block 92 is input to a M4SBH window 94, which operates as described above in connection with block 60. The output of block 94 is input to a 2048-point FFT 96, which processes the signal as described above in connection with block 62. Because of the greater number of data points, the resulting 1024 bins are in ½ Hz increments. The signals of blocks 96 are input to the adaptive beamforming block 98, which also receives the output of Kalman filtering block 90. Block 98 functions similarly to block 64 above, except beamforming takes place only on target beams as determined by the output of block 90. Similarly to block 64 above, the beampower equation is solved for each target beam for the 384 predetermined frequencies. The output of the beamforming operation block 98 is one spectrum for each of the detected targets from tracker block 40.

The output of block 98 is input to target classifier 100, which compares the frequency spectrum(s) to stored frequency spectrums for known vehicle classes, which is well known in the art. The output of the target classifier, multiple target class estimates, is stored or transmitted as described above in connection with the multiple target azimuth estimates.

Figure 8:
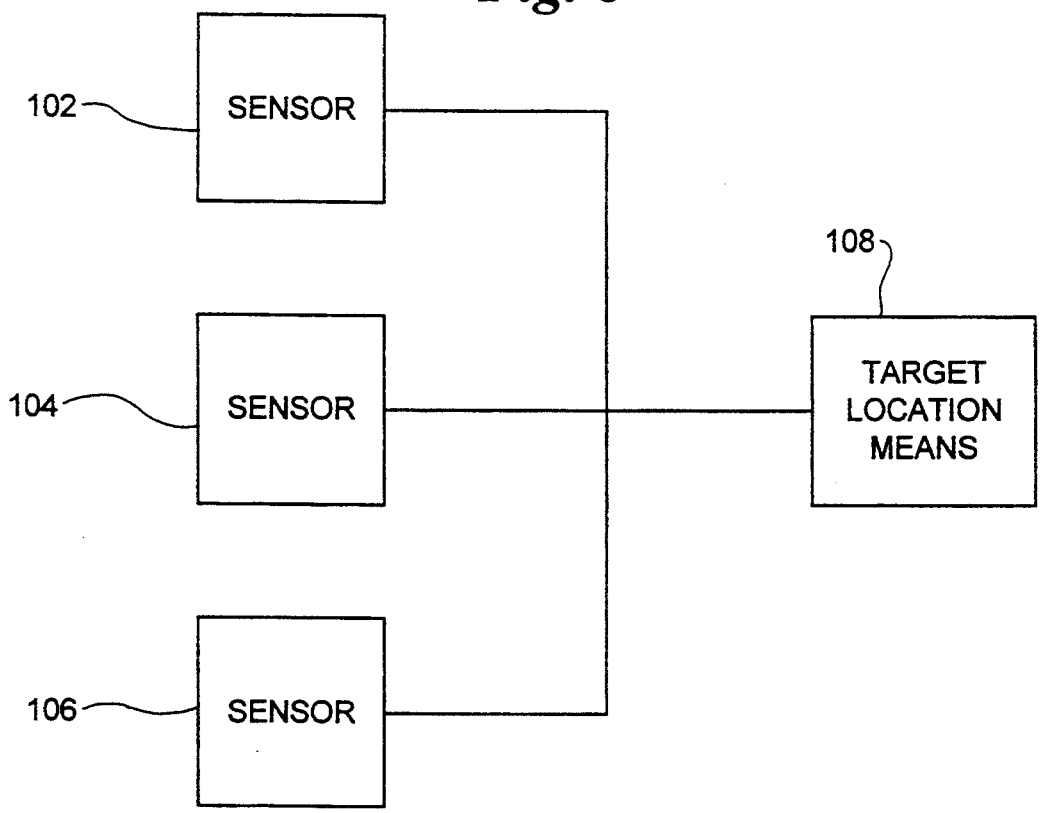
FIG. 8 is a block diagram of a plurality of sensors of the invention utilized with target location means for determining the location and path of detected targets.

Referring now to FIG. 8, a target tracking system utilizing at least three of the inventive sensors is shown. Blocks 102, 104 and 106 represent three sensors 10 which have been deployed over a predetermined area. The azimuth and class estimates of each of the three, or more, sensors are transmitted to target location means 108, which analyzes the data, using triangulation to determine the location of the target. Each sensor may include a timing means so that the location of a target may be determined at discrete time intervals. In this manner both the course and velocity of the target may be determined.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the an may recognize other equivalents to the specific embodiments described herein which equivalents are also intended to be encompassed by the claims attached hereto.

What is claimed is:

1. A compact deployable sensor comprising:
   a) a housing;
   b) a plurality of transducers carried inside the housing;
   c) means for randomly distributing the transducers within a predefined area surrounding the housing, the transducers being conductively connected to the housing and each generating an analog output signal indicative of the acoustic energy received from a target;
   d) self-survey means electrically connected to the plurality of transducers for determining the position of the transducers relative to the housing;
   e) computing means electrically connected to the plurality of transducers for analyzing acoustic energy received by the plurality of transducers.

2. The compact deployable sensor of claim 1 wherein the computing means for analyzing acoustic energy comprises:
   a) means for converting the analog output signals of each transducer at a predetermined sampling rate into digital signals;
   b) means for adaptive beamforming connected to the digital signals of the transducers wherein a predetermined number of beams are generated and the acoustic energy received in each beam is determined, and
   c) target detection means connected to the adaptive beamforming means for determining the median acoustic energy of the beams and locating beams with an acoustic energy a predetermined amount above the median acoustic energy whereby a signal constituting the azimuth angle to the target emitting the received acoustic energy is produced.

3. The compact deployable sensor of claim 2 wherein the computing means for analyzing acoustic energy further comprises:
   a) second means for adaptive beamforming connected to the digital signals of the transducers and connected to the target detection means wherein only beams with an acoustic energy a predetermined amount above the median acoustic energy are determined;

b) means for classifying connected to the second means for adaptive beamforming wherein the frequency spectrum corresponding to the beams is determined and compared to stored spectrums corresponding to known targets whereby the particular target emitting the acoustic energy is determined.

4. The compact deployable sensor of claim 3 wherein the housing includes means for erecting the housing in an upright position regardless of deployment position.

5. The compact deployable sensor of claim 4 wherein the housing includes a azimuth orientation means carried within the housing for orienting the device relative to magnetic north and a differential global positioning means for determining the latitude and longitude of the sensor.

6. The compact deployable sensor of claim 5 wherein the housing includes a communication means for transmitting data to a receiver.

7. The compact deployable sensor of claim 6 wherein the data transmitted is the location of the sensor and/or the azimuth of the target and/or the class estimate of the target.

8. The compact deployable sensor of claim 3 wherein the self-survey means comprises:
 a) means for deploying a first and second transducer of said plurality of transducers in a predetermined position relative to the housing such that the first and second transducers are colinear, wherein the position of the first transducer defines the origin of a coordinate system;
 b) means for sequentially emitting a sound from the first and second transducers and from at least one other of the plurality of transducers, said three transducers defining a reference plane;
 c) means for determining the sound travel time from the emitting transducer to each of the other plurality of transducers;
 d) means for computing the distances between the emitting transducer and each of the other transducers defining the reference plane wherein a coordinate system is defined and the position of each reference transducer is determined;
 e) means for computing the position of the other plurality of transducers in the coordinate system using the sound travel time information.

9. The compact deployable sensor of claim 8 wherein four transducers are utilized to define a three-dimensional coordinate system, three of the four transducers defining a reference plane, with the fourth transducer being nonplanar with the reference plane, each of the four transducers sequentially emitting a sound which is used to compute the position of all four transducers in the coordinate system, and which is used to compute the position of each of the other plurality of transducers in the coordinate system.

10. The compact deployable sensor of claim 8 wherein the housing includes means for erecting the housing in an upright position regardless of deployment position.

11. The compact deployable sensor of claim 10 wherein the housing includes a global positioning means for determining the latitude and longitude of the sensor.

12. The compact deployable sensor of claim 11 wherein the housing includes a communication means for transmitting data to a receiver.

13. The compact deployable sensor of claim 12 wherein the data transmitted is the location of the sensor and/or the azimuth of the target and/or the class estimate of the target.

14. Apparatus for determining actual target location comprising:
 a) at least three sensors distributed over a predetermined area, each sensor comprising:
  1) a housing;
  2) azimuth orientation means carried within the housing for orienting the device relative to magnetic north;
  3) a plurality of transducers carried inside the housing;
  4) means for randomly distributing the transducers within a predefined area surrounding the housing, the transducers being conductively connected to the housing and each generating an analog output signal indicative of the acoustic energy received from a target;
  5) self-survey means electrically connected to the plurality of transducers for determining the position of the transducers relative to the housing;
  6) computing means electrically connected to the plurality of transducers for analyzing acoustic energy received by the plurality of transducers;
 b) each sensor including a global positioning means to determine azimuth and elevations of each sensor;
 c) each sensor including adaptive beamforming means to determine azimuth angle to a target from each sensor;
 d) each sensor including transmission means for transmitting the azimuth angle to a target from each sensor to a computing means which determines the target location using triangulation.

15. The apparatus of claim 13 in which each sensor includes timing means such that the target location for at least two discrete times can be determined, whereby the target velocity and course can be determined.

16. A method for sensing targets comprising the steps of:
 a) deploying a sensor comprising:
  1) a housing;
  2) a plurality of transducers carried inside the housing;
  3) means for randomly distributing the transducers within a predefined area surrounding the housing, the transducers being conductively connected to the housing and each generating an analog output signal indicative of the acoustic energy received from a target;
  4) self-survey means electrically connected to the plurality of transducers for determining the position of the transducers relative to the housing;
  5) computing means electrically connected to the plurality of transducers for analyzing acoustic energy received by the plurality of transducers;
 b) deploying a first and second transducer of said plurality of transducers in a predetermined position relative to the housing such that the first and second transducers are colinear, wherein the position of the first transducer defines the origin of a coordinate system;
 c) sequentially emitting a sound from the first and second transducers and from at least one other of the plurality of transducers, said three transducers defining a reference plane;
 d) determining the sound travel time from the emitting transducer to each of the other plurality of transducers;

e) computing the distances between the emitting transducer and each of the other transducers defining the reference plane wherein a coordinate system is defined and the position of each reference transducer is determined;

f) computing the position of the other plurality of transducers in the coordinate system using the sound travel time information, and g) determining the target azimuth from analyzing the acoustic energy received by the plurality of transducers.

17. The method of claim 16 further including the step of determining the target class from analyzing the acoustic energy received by the plurality of transducers.

18. The method of claim 16 wherein the sensor further includes azimuth orientation means carried within the housing for orienting the device relative to magnetic north, global positioning means to determine azimuth and elevations of the sensor and a communication means for transmitting data to a receiver, further comprising the steps of:

a) transmitting the data relating to azimuth and/or class estimate to the receiver.

19. The method of claim 18 further including the steps of:

a) deploying at least three of the sensors over a predefined area;

b) triangulating the three sensor azimuth angles to determine target location.

20. The method of claim 19 wherein each sensor includes timing means and further including the step of determining the target location for at least two discrete times, whereby the target velocity and course can be determined.

* * * * *